October 17, 1913.

DRAWING 7,325

A careful search has been made this day for the original drawing or a photolithographic copy of the same, for the purpose of reproducing the said drawing to form a part of this book, but at this time nothing can be found from which a reproduction can be made.

Finis D. Morris,
        Chief of Division E.

AWK

UNITED STATES PATENT OFFICE.

E. H. PARSONS AND S. E. PARSONS, OF WILKES-BARRE, PENNSYLVANIA.

HANGING SAWS IN SAWMILLS.

Specification of Letters Patent No. 7,325, dated April 30, 1850.

*To all whom it may concern:*

Be it known that we, E. H. PARSONS and SANFORD E. PARSONS, of Wilkes-Barre, in the county of Luzerne and State of Pennsylvania, have invented a new and useful Improvement in the Method of Hanging Mill-Saws; and we do hereby declare that the following is a full, clear and exact description of our invention, reference being had to the accompanying drawing, which forms part of this specification, and in which—

Figure 1 represents a view in perspective of a mill-saw hung in the manner invented by us, and Fig. 2 is a horizontal section of the same at the line $x\ x$ of Fig. 1.

Our invention consists in hanging the saw in advance of its front or cutting edge in such manner that the pressure of the log advanced against it will tend to keep it in line with the direction in which the carriage is advancing thus dispensing with the heavy saw-gate usually required to strain the saw. In order to effect this result each extremity of the saw A is fitted with a light frame B B′, with the lower one of which the pitman is connected by which the saw is driven; the frames project in front of the cutting edge of the saw and each is fitted at its front extremity with a pair of brasses $a\ a'$ which embrace a double V shaped guide C, but are not set up tightly against it. The guides C, C, are supported at their upper and lower extremities by brackets D projected from the framing of the mill, and are fitted with set-screws by which they are adjusted to their position. It will now be perceived that when a log is forced by the carriage against the cutting edge of the saw, the pressure will cause the saw to turn horizontally upon the guides as axes until its horizontal direction corresponds with the direction in which the log is advanced by the carriage, the saw being thus forced to run true while sawing.

When the saw is not cutting, the guides thus far described are not sufficient to keep the saw steady and hence it becomes necessary to apply a pair of single V guides E E directly behind the saw and parallel with those in front. Each of the frames B B′, is also fitted at its hinder extremity with a brass $b$ to run upon the hinder guide. These brasses are not set up snug against their guides but a sufficient play is given to allow the saw to accommodate itself to the direction in which the carriage moves. When the saw is cutting the hinder brasses do not act, as the pressure of the log alone against the cutting edge not only steadies it but tends as before described to keep it running truly.

The saw is prevented from buckling or bending longitudinally above the log by a pair of guide blocks or noddle pins $d\ d$ which are secured to a yoke G; the latter embraces the saw and forms the lower cross piece of an adjustable sliding frame H which can be raised or depressed according to the thickness of the log on the carriage.

What we claim as our invention and desire to secure by Letters Patent, is—

The method of hanging a mill-saw from guides in advance of its front edge which sustain the whole pressure caused by the advancement of the wood on the carriage against the saw teeth, the plate of the saw swinging on the advanced guides as pivots, so that when cutting it is kept running in a plane passing through the guides in the direction in which the carriage moves, as a vane is kept by the wind in the direction in which it blows.

E. HERVEY PARSONS.
SANFORD E. PARSONS.

Witnesses:
G. BURROWS,
JOHN C. GRIER.